Sept. 18, 1956  A. J. D. LENZ  2,763,083
DEVICE FOR HOLDING A LINE ON A ROD
Filed Aug. 17, 1953

Inventor
Alvin J. D. Lenz
By McCanna and Morsbach
Attys.

United States Patent Office 2,763,083
Patented Sept. 18, 1956

2,763,083
DEVICE FOR HOLDING A LINE ON A ROD

Alvin J. D. Lenz, Sycamore, Ill.

Application August 17, 1953, Serial No. 374,730

4 Claims. (Cl. 43—25.2)

This invention relates to fish poles and rods and more particularly pertains to a rod or pole having apparatus for retaining the fish hook and line in position when not in use, and the method of using the same.

When casting rods and the like are used in fishing it is common practice to attach the reel and thread the line at the start of a day's fishing and during the balance of the day transport the rod and reel in an assembled condition as the fisherman moves from place to place, the hook being engaged over a part of the reel and the line drawn taut at such times. Frequently two or more rods are bunched together and handled as a unit during such movement. This almost invariably produces an annoying tangle of hooks and lines, largely because the drag on the rod is incapable of holding the line tight and a slight pull on the line causes the reel to spin and dump a considerable quantity of line. Often the hook or line catches in other obstructions, thereby delaying the angular and sometimes damaging the hook or the line. Furthermore, the line between the hook and the reel normally tends to become slack due to the weight of the sinkers and other articles on the fish line acting to withdraw line from the reel thereby forming a loop which also tends to snag on obstructions or become entangled with the lines of other fish rods similarly arranged.

An important object of this invention is to provide a rod having means adapted to prevent the hook and line from swinging free of the rod while being transported whereby snagging of the hook and line on an obstruction is prevented.

Another object of this invention is to provide a fishing rod having means for retaining a hook and line thereon in a threaded condition on a rod which prevents the hook and line from swinging free from the rod when the latter is being transported and which is so constructed as to minimize the possibilities of becoming entangled therewith during the act of fishing.

Another object of this invention is to provide a fishing rod having means to retain the barbed end of the fish hook attached to a line threaded on the rod during transportation or storage of the rod which acts to resiliently grip the line between the hook and the tip of the rod and also grip the line between the tip of the rod and the reel to thereby retain the fish hook in the guard and maintain the line in a taut fashion on the rod to prevent the formation of a slack loop in the line which can become entangled on an obstruction.

A further object of this invention is to provide a fishing rod wherein a line threaded thereon and the attached hook, plug, sinkers or the like may be secured to the rod at spaced points beyond the reel without dismantling.

Yet a further object of this invention is to provide a fish hook and line retaining device for a fishing rod which is of simple construction, which is easily fabricated and which is highly efficacious for its intended purpose.

Other objects and many of the attendant advantages of this invention will be more readily appreciated as the same becomes better understood by reference to the following detailed description when considered in connection with the accompanying drawings wherein:

Fig. 5 is a fragmentary isometric view showing of a modified form.

Figure 1:
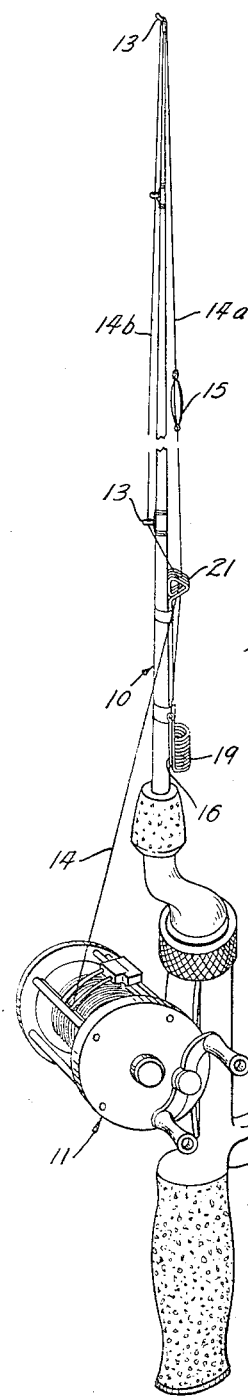
Figure 1 is an elevational view showing a fishing rod according to my invention with the hook and line attached thereto.

Referring more specifically to the accompanying drawings there is illustrated a fishing rod 10 having a line receiving reel 11 mounted on top of the rod adjacent the handle portion 12 thereof, which reel, as is conventional, extends laterally of one side of the rod. A plurality of line receiving eyes or guides 13 are attached to the rod 10 spaced longitudinally thereon on the same side as the reel. A line 14 is wound on the reel and has one end portion thereof extending through the guides 13 and terminating in a suitable type of bait such as a casting plug, hook or the like exemplified in this instance by a hook 16. A sinker 15 or conventional equipment may be positioned on the line adjacent the hook 16 in the usual way. In accordance with the present invention, means are provided positioned on the bottom of the rod for encasing the barbed end of the hook and retaining the latter in position on the rod when not in use and for gripping the line between the hook and the tip of the rod and again between the tip of the rod and the reel adjacent the reel to thereby retain the hook in position on the holder therefor and also maintain the line taut on the pole and normally prevent withdrawal of line from the reel when the line strung along the rod catches in an obstruction.

The line retaining apparatus comprises an elongated mounting piece 18 which is attached to the rod 10 on the under side thereof adjacent the handle portion and preferably between the reel and the line guide nearest the reel. A hook guard 19 which may advantageously be of tubular form is provided on the end of the mounting piece adjacent the reel and is arranged to extend longitudinally of the rod whereby the barbed end of the hook 16 may be inserted in the open end of the guard remote from the tip of the rod. A line retaining coil 21 is provided on the other end of the mounting piece and is arranged so that the axis thereof extends transversely of the rod 10 whereby when the hook is inserted in the guard and the section of the line adjacent the hook drawn taut and the line inserted between adjacent convolutions thereof as shown at 21a the hook will be retained in the guard therefor. The retaining coil 21 also serves to hold taut that portion of the line which extends from a point behind the rear guide, outward through the guides and back to the coil 21 indicated by the numerals 14a and 14b and in so attaching the line in stored condition the line is grasped adjacent the rear of the rod, drawn taut and then slipped between two convolutions of the coil 21 as shown at 21b.

Figure 3:
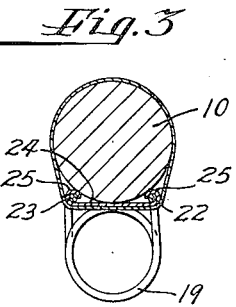
Fig. 3 is a transverse sectional view taken on the plane 3—3 of Fig. 2.

The retaining means may advantageously be formed of wire in which the mounting piece 18 comprises a pair of straight, substantially parallel support sections 22 and 23 and an elongated mounting plate 24 having the side portions 25 thereof inwardly rolled around the support sections to firmly grip the latter and thereby form a rigid mounting piece. As is best illustrated in Fig. 3, the central portion of the plate 24 rests on the convex surface of the rod 10, with the inwardly rolled sides 25 thereof abutting the rod to thereby prevent lateral tilting of the mounting piece on the rod. Conveniently, the mounting piece may be removably attached to the rod by spaced bands of adhesive tape 26, though any suitable means may be employed.

Figure 2:
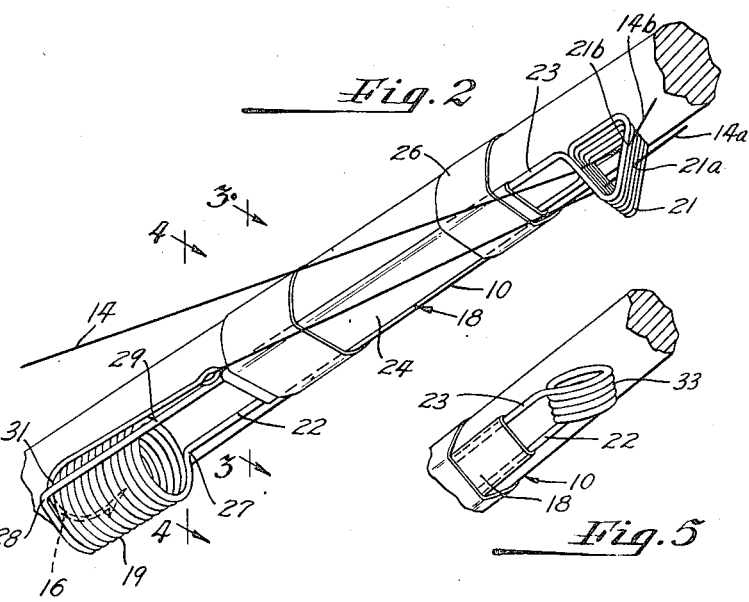
Fig. 2 is an enlarged fragmentary isometric view of the rod showing the hook and line retaining means.
Figure 4:
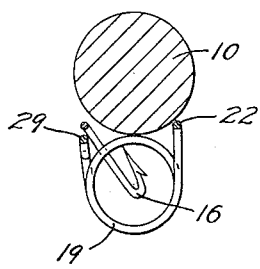
Fig. 4 is a transverse sectional view taken on the plane 4—4 of Fig. 2.

In the preferred form of the invention, an intermediate portion of the wire having end portions integral with support sections 22 and 23 is convoluted to form a tubular coil constituting the hook guard 19. The coil may be of the form having a circular cross section, as illustrated in the drawings, or may be of any other desired form suitable for protectively encasing the barbed end of the fish hook. The coil is disposed longitudinally between the support members and laterally offset from the plane thereof, whereby the hook guard coil 19 abuts the rod when the mounting piece is attached to the rod. As is best illustrated in Figs. 3 and 4, the end convolution of the hook guard coil 19 adjacent the mounting piece 18 extends tangentially from the side of the coil to a point 27 adjacent the rod where it is bent at a substantially right angle to the plane of the coil and joins the support section 22. The last convolution on the other end of the hook guard coil is bent at a point 28 spaced from the plane of the support members (see Fig. 2) at substantially a right angle to the plane of the end convolution and joins the end portion 29 of the support section 23, which end portion overlies the outer surface of the hook guard. The end portion 29 is inclined towards the plane of the support sections and merges with support section 23 adjacent the end of the mounting plate 24. Thus, the end convolution of the hook guard coil 19, at the point of juncture with the end portion 29 of the support section 23, provides a shoulder on the end of the hook guard. This shoulder is spaced from the rod 10, and in conjunction therewith provides a notch or seat 31 for the curved portion of the hook 16. When the barbed end of the hook is inserted in the hook guard 19, and the line leading therefrom drawn taut and pressed between the convolutions of the line retaining coil, the curved portion of the hook may be positioned in the seat 31 whereby the shank of the hook will extend as illustrated in Figs. 2 and 3 between the end portion 29 and the rod 10. The hook is thus retained close to the rod 10 and the line between the hook and the line retaining coil 21 lies close to the mounting piece 18.

The tubular line retaining coil 21 may advantageously be formed integrally with the oher ends of the support sections 22 and 23, with the ends of the line retaining coil terminating adjacent the underside of the coil, at which points the ends of the coil join the support sections 22 and 23. The line retaining coil thus projects laterally from one side of the support sections whereby the line may readily be passed between adjacent convolutions of the coil.

It is preferable, when forming the parts of wire, to use a single piece of wire in which one of the support sections such as 23 and the coils 19 and 21 are shaped from intermediate portions of the wire piece, and the end sections of the wire terminate in closely spaced adjacency to form the other support section 22. The mounting plate 24 which is positioned so as to overlie the ends of the wire thus also retains the ends in proper position.

The embodiment illustrated in Fig. 5 is similar to that illustrated in Figs. 1–4 and like numerals are used to designate the same parts. The sole difference in the form of Fig. 5 lies in the fact that the line retaining coil which may have the shape shown at 21 or which may be in the form of a circular cylinder as shown at 33, is angularly offset or inclined at an angle to the support sections 22 and 23. More specifically, the axis of the coil 33 extends preferably parallel to the plane of the support sections and at an acute angle to the plane perpendicluar to the support sections. Thus, when the rod is used for casting and held so that the reel 11 faces upwardly, any slack which may be formed between the reel and the first guide 13 will not catch on the coil 33.

When not in use, it is intended that the hook 16 be positioned with the barbed end thereof extending into the open end of the hook guard 19 remote from the tip of the rod with the curved portion of the hook resting in the seat 31. The section of the line 14 between the hook and the tip of the rod is then passed between a pair of adjacent convolutions of the line retaining coil and the section of the line between the line guide and the reel then passed between a different pair of convolutions on the line retaining coil. The line is preferably tensioned while attaching the sections thereof to the line retaining coil and thereafter the reel is wound to take up the slack in the line between the line retaining coil 21 and the reel. Obviously, because of the specific construction of the line retaining coil and its position on the rod relative to the reel, winding of the reel to take up the slack in the line will also tend to force the line down further between the adjacent convolutions of the line retaining coil and so aid in positioning or attaching the line thereto. Thereafter the line is retained in its taut condition by the resilient gripping action of the line retaining coil. The hook is thus retained in position on the guard therefor and the formation of a slack loop, due to the weight of the sinkers 17 or other lures on the line is obviated. Since the hook guard 19 and line retaining coil 21 are disposed on the side of the rod opposed to that from which the reel extends, it is apparent that the use of the rod for casting and the like is not impaired.

While in the foregoing description there are disclosed specific preferred forms of the present invention, it is to be understood that various modifications and refinements which depart from the described forms of the invention may be adopted without departing from the spirit and scope of the invention.

I claim:

1. A fish hook and line retaining attachment for a fish pole comprising a single piece of wire having a first straight elongated support section, a line receiving coil formed integrally with one end of said first support section with the axis of the coil extending transversely thereof, a hook receiving coil formed integrally with the other end of said first support section with the axis thereof parallel thereto, a second support section including first and second end portions of said wire respectively formed integrally with the ends of said hook receiving coil and said line receiving coil remote from said first section, said second support section extending parallel to said first section and lying in a common plane therewith, said coils being laterally offset from the same side of said plane, and means for attaching said support sections to a fishing rod to extend longitudinally thereof with said coils disposed laterally of one side of the fishing rod.

2. The combination of claim 1 wherein the axis of said line receiving coil is disposed at an angle of less than ninety degrees to said support sections.

3. The combination of claim 2 including a mounting plate overlying said first and second support sections and having the sides thereof inwardly rolled on said support sections to retain said sections in parallel spaced relation with said end portions in axial alignment.

4. A fish hook and line retaining attachment for a fish pole formed of wire and including a pair of straight substantially parallel support sections, a cylindrical line receiving coil formed integrally with one pair of adjacent ends of said support sections and extending transversely therebetween, a cylindrical hook receiving coil formed integrally with the other ends of said support sections and extending longitudinally therebetween, said coils being laterally offset from the plane of said support sections whereby said coils abut the fishing rod when said support sections are disposed longitudinally thereon, an elongated mounting plate overlying said support sections and having inwardly rolled edges thereon embracing said sections, and means for attaching said mounting plate to a fishing rod with the support sections extending longitudinally thereof.

References Cited in the file of this patent

UNITED STATES PATENTS

| | | |
|---|---|---|
| 909,722 | West | Jan. 12, 1909 |
| 1,011,081 | Reely | Dec. 5, 1911 |
| 1,269,743 | Richmond | June 18, 1918 |
| 1,957,352 | Patricoski | May 1, 1934 |